Feb. 1, 1955
J. N. BUTTS
2,700,840
FISHHOOK SNELLING DEVICE
Filed June 23, 1953
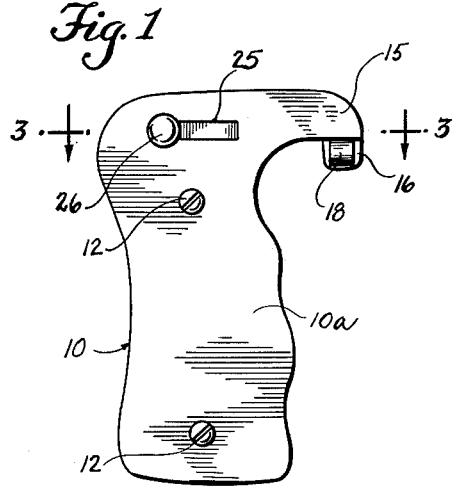
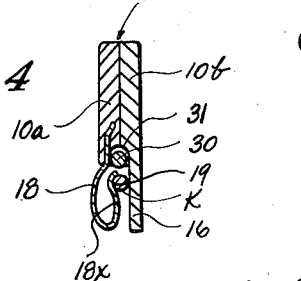
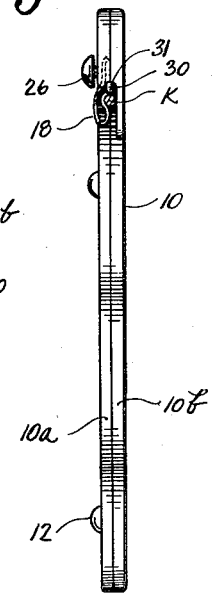
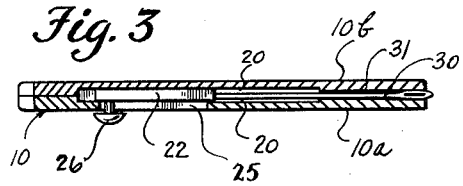
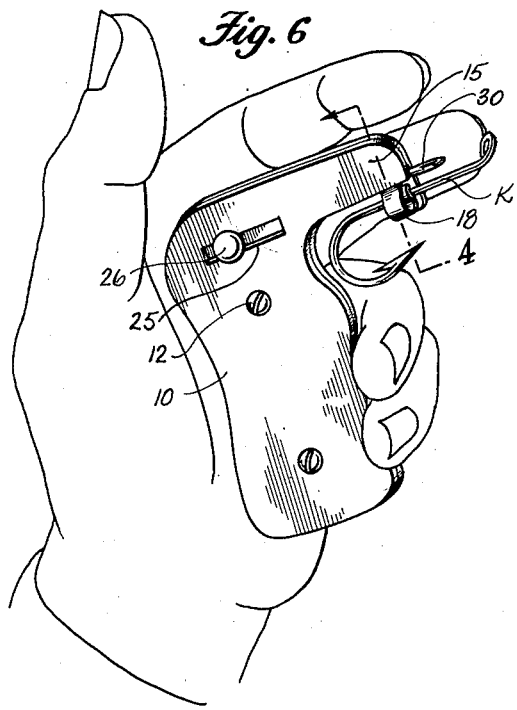
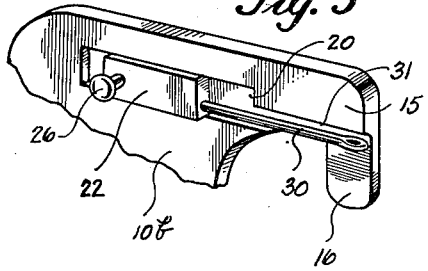
INVENTOR.
JOHN N. BUTTS
BY
Cook & Robinson
ATTORNEYS

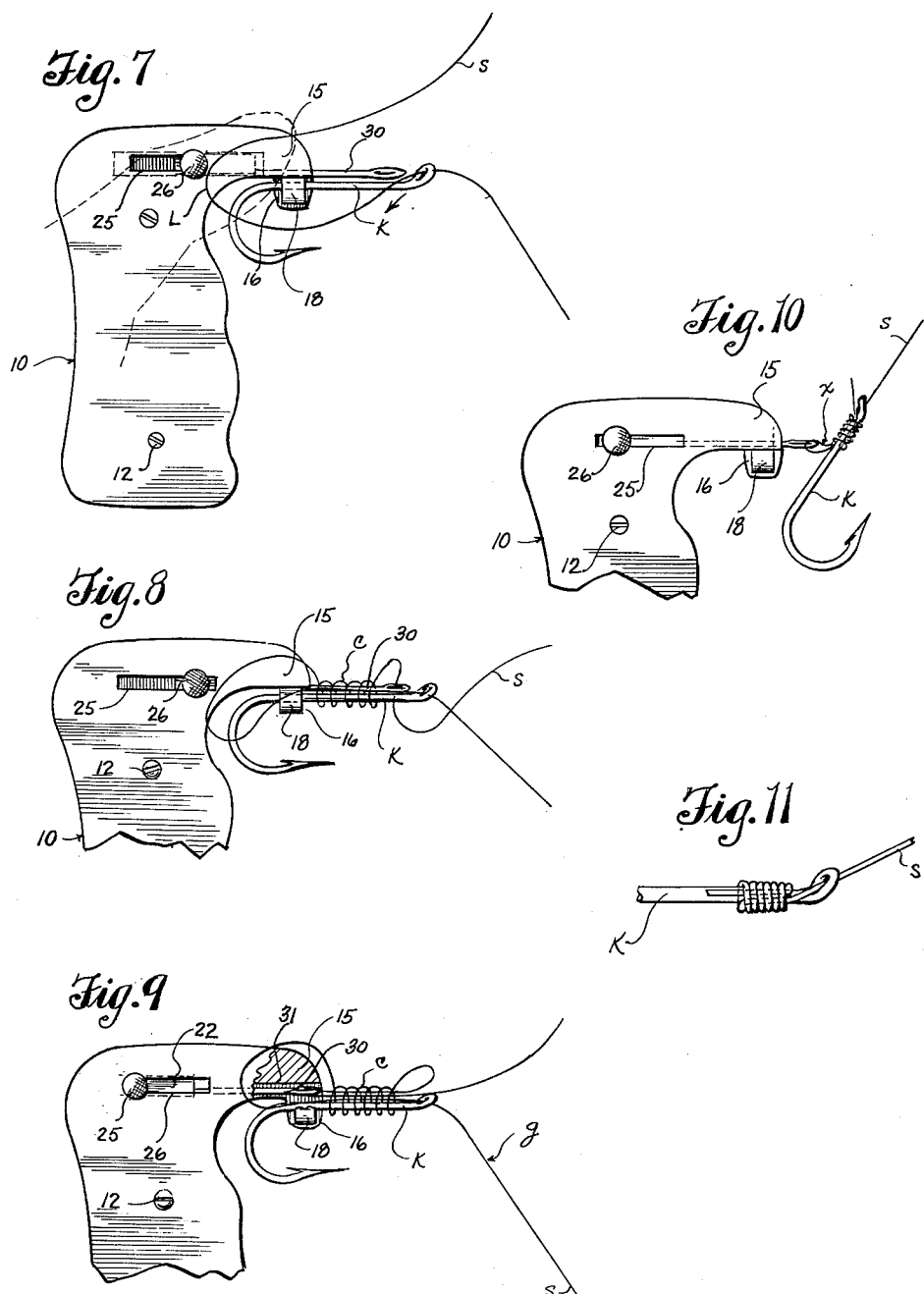

United States Patent Office 2,700,840
Patented Feb. 1, 1955

2,700,840

FISHHOOK SNELLING DEVICE

John N. Butts, Alderwood Manor, Wash.

Application June 23, 1953, Serial No. 363,635

4 Claims. (Cl. 43—1)

This invention relates to a fish hook snelling device and it has for its principal object to provide a simple, substantial, relatively inexpensive and easy to use device for the attaching of a snell or leader to a fish hook in a secure and compactly formed knot.

It is a further object of the invention to provide a device for the above purpose that is compact and easily held in the hand while the snelling operation is being performed.

Further objects and advantages of the invention reside in the details of construction of its various parts; in their combination and relationship and in the manner of their use, as will hereinafter be fully described.

In accomplishing these and other objects of the invention, I have provided the improved details of construction, the preferred forms of which are illustrated in the accompanying drawings, wherein:

Fig. 1 is a perspective view of a fish hook snelling device embodying the present invention.

Fig. 2 is a somewhat enlarged edge view of the device as seen from the right hand side in Fig. 1.

Fig. 3 is a horizontal section of the device taken on line 3—3 of Fig. 1.

Fig. 4 is an enlarged cross-sectional detail taken on line 4—4 in Fig. 6.

Fig. 5 is a fragmental perspective view showing the needle and its mounting block as slidably contained in a guide channel of one of the side plates of the device.

Fig. 6 is a perspective view showing the manner in which the snelling device is held in the hand for use, and the manner in which the fish hook is applied thereto preparatory to the attaching of the snell.

Figs. 7, 8, 9 and 10 are views diagrammatically illustrating successive operations in the securing of a snell or leader to a hook.

Fig. 11 is an enlargement of the finished knot which attaches the snell to the hook.

Referring more in detail to the drawings:

The snelling device of the present invention comprises a handle portion which is herein designated in its entirety by numeral 10 and which may be made of metal, plastic or other suitable material. It is thin and flat and preferably of such size as to be easily held in the palm of the hand, as shown in Fig. 6, and as presently made, measures approximately three inches from lower edge to top edge, in respect to its showing in Figs. 1 and 6, and is approximately one and one-fourth inches in width, and one-eighth inch thick. It comprises two opposite and complemental face plates, designated respectively, in Figs. 2, 3 and 4, by reference numerals 10a and 10b; these plates being fixedly secured together, in registration, by means of two rivets or by screws 12 as shown.

At its upper end, as considered in its showing in Figs. 1 and 2, the handle is formed with a lateral extension 15. At the under edge, and outer end portion of one of the side plates which form this extension, is a downwardly projecting lip 16; this being well shown in the edge view of Fig. 2, and also in Fig. 5. Secured to the other side plate, and opposite the lip 16, is a U-shaped spring clip 18 having one of its leg portions elongated and fixed to the side plate and its shorter inner leg portion 18x, extended along the inner face of the lip 16 and terminating in a free end portion that is formed with a horizontal channel 19 that is faced toward the lip. The leg portion 18x is yieldable from and it is so spaced from the lip that the shank of a fish hook can be pressed between these parts and seated in the cross-channel 19 of leg 18x. When so seated, it will be held securely in position for the snelling operation.

Formed in the inner surfaces of the upper end portions of the two face plates 10a and 10b, as best seen in Fig. 3, are horizontal channels 20—20; these being in registration and containing a metal block 22 therein for limited endwise shifting. Formed through the plate 10a, as noted in Figs. 1 and 3, and extending along the channel is a slot 25. Fixed in the block 22 is a stud with knurled head 26 at its outer end. The stud extends through the slot as is shown in Fig. 6, to serve as a means for manually shifting the block 22.

Fixed in the block as shown in Fig. 5, is a needle 30; the needle being held by its point portion with its eyelet at the outer end. This needle extends through a horizontal channel 31 that leads from the block containing channels to the outer end of the extension 15, opening therefrom immediately above the base of the lip 16, as is shown in Fig. 2. By the horizontal shifting of the block 22, through the mediacy of the head of the stud 26, the needle can be caused to be extended, as seen in Fig. 7 along the shank of a fish hook as applied to the securing clip, or to be retracted entirely within the channel to a position as in Fig. 5.

Assuming the present snelling device to be so constructed, its mode of use for attaching a snell to a hook is as follows:

First, the device is placed in the palm of the left hand substantially as shown in Fig. 6, and the fish hook K is applied thereto. In effecting this application of the hook, the shank portion thereof is pressed upwardly between the lip 16 and the inside leg 18x of the spring clip thus to engage it with the seat 19 as well shown in Fig. 4. Then, by means of the stud 26, the block 22 is shifted from left to right thus to cause the retracted needle to be extended to the position of Fig. 7 to place the eye end thereof just within the eye end of the hood shank. The end of the snell, or leader s is then passed through the eye at the end of the hook shank and an end portion thereof drawn through and formed in a loop L against the side of the handle portion. This loop is then held in place by pressing it against the handle extension 15 by means of the thumb of the hand in which the device is held; the position of the thumb being shown in dotted lines in Fig. 7. The free end portion of the snell is then grasped by fingers of the right hand and is wound in a succession of turns c about the needle and hook shank, as seen in Fig. 8, working therealong from the end of part 15 toward the eye end of the hook. After about five or six turns have thus been made, the end of the leader is threaded through the eye of the needle and is drawn tight. Then the stud 26 is shifted to the left, and the needle is caused to be shifted inwardly, thus drawing that portion of the leader that is passed through the needle eye, back along the hook shank, inside of the several turns of the leader that had previously been formed about the needle and hook shank. The leader is then grasped just beyond the eye of the hook, approximately at point g in Fig. 9, and is drawn tight, thus to tighten all of the turns of the leader that were taken about the hook shank, over the enclosed end portion. The hook is then unseated from between the lip 16 and the holding spring clip, as in Fig. 10, and the loop of the snell through the needle eye is cut, as at point X, thus to free the knot from the needle. Finally, the free end portion of the leader is then pulled from the knot and the snelling operation is completed. The knot is then as shown in enlarged view in Fig. 11.

This present device, made and used as above described, provides for easy, rapid and secure attachment of a leader or snell to the hook. The device, as shown, will accommodate hooks of various size.

Having thus described my invention, what I claim as new therein and desire to secure by Letters Patent is:

1. A fish hook snelling device of the character described for attaching a snell to a fish hook having a shank portion and an eyelet at one end, said device comprising a handle portion, means on the handle portion for gripping the shank of the fish hook at a distance from its eyelet and, a needle mounted by the said handle portion close to and extended along the hook shank as held by the gripping means and a manually movable means for shifting the needle endwise along the shank toward and away from the eyelet end of the hook, and an eyelet in the outer end of the needle for the passing a snell therethrough.

2. A hook snelling device as in claim 1 wherein the means for gripping the shank portion of a fish hook comprises relatively yieldable parts between which the hook shank can be pressed for its rigid securement thereby.

3. A hook snelling device comprising a handle portion formed with a laterally extending arm, coacting gripping means at the outer end of said arm for receiving the shank portion of a hook having an eyelet end between them to secure the hook with said eyelet end of the shank extended beyond the arm, said laterally extending arm being formed with a channel that is close to and parallel with the shank of the hook as held by said gripping means, a needle mounted in the channel for retraction and extension from the arm to lie along the eyelet end of the secured hook, and means slidably mounted in the handle and mounting the needle for effecting its retraction and extension, said needle having an eye at its outer end to receive a snell therethrough.

4. A hook snelling device comprising a handle member adapted to be held in the palm of the hand, and provided at one end with a laterally extending arm, means at the outer end and lower edge of said arm for gripping a fish hook shank to hold an end of said shank which includes an eyelet extended beyond the arm; said arm having a needle mounted therein for endwise movement from a position retracted within the arm to a position extended along the shank of the fish hook as held by the gripping means, a block slidably mounted in the handle member and mounting the inner end of the needle therein, and a button fixed to the block and exposed at a face of the handle as a means for shifting the block to effect the extension and retraction of the needle; and said needle having an eyelet at its outer end.

References Cited in the file of this patent

UNITED STATES PATENTS

| | | |
|---|---|---|
| 2,107,645 | Parkhurst | Feb. 8, 1938 |
| 2,601,605 | Fulvio | June 24, 1952 |